(12) United States Patent
Baldemair et al.

(10) Patent No.: US 11,804,937 B2
(45) Date of Patent: Oct. 31, 2023

(54) PHYSICAL UPLINK CONTROL CHANNEL (PUCCH) RESOURCE SELECTION BEFORE RADIO RESOURCE CONTROL (RRC) CONFIGURATION

(71) Applicant: Telefonaktiebolaget LM Ericsson (publ), Stockholm (SE)

(72) Inventors: Robert Baldemair, Solna (SE); Sorour Falahati, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 7 days.

(21) Appl. No.: 17/046,948

(22) PCT Filed: Apr. 16, 2019

(86) PCT No.: PCT/EP2019/059803
§ 371 (c)(1),
(2) Date: Oct. 12, 2020

(87) PCT Pub. No.: WO2019/201917
PCT Pub. Date: Oct. 24, 2019

(65) Prior Publication Data
US 2021/0050980 A1    Feb. 18, 2021

Related U.S. Application Data

(60) Provisional application No. 62/658,284, filed on Apr. 16, 2018.

(51) Int. Cl.
*H04L 5/00* (2006.01)
*H04W 72/04* (2023.01)
*H04W 72/20* (2023.01)

(52) U.S. Cl.
CPC .......... *H04L 5/0053* (2013.01); *H04L 5/0005* (2013.01); *H04W 72/20* (2023.01)

(58) Field of Classification Search
CPC ............ H04W 72/0406; H04L 5/0005; H04L 5/0053; H04L 5/0007
See application file for complete search history.

(56) References Cited

U.S. PATENT DOCUMENTS

2012/0020317 A1   1/2012 Ishii et al.
2012/0275395 A1 * 11/2012 Gerstenberger ...... H04W 52/34
                                                370/329
(Continued)

FOREIGN PATENT DOCUMENTS

JP    201750186 A   3/2017
RU     2631660 C1   9/2017
(Continued)

OTHER PUBLICATIONS

Indian Office Action dated Dec. 3, 2021 for Patent Application No. 202017044553, consisting of 7-pages.
(Continued)

*Primary Examiner* — Maharishi V Khirodhar
*Assistant Examiner* — Kenneth P Hunt
(74) *Attorney, Agent, or Firm* — Christopher & Weisberg, P.A.

(57) ABSTRACT

A method, system and apparatus are disclosed. A network node configured to communicate with a wireless device (WD) is provided. The network node is configured to, and/or comprising a radio interface and/or comprising processing circuitry configured to determine a resource configuration for PUCCH resource allocation for a wireless device, and provide the configuration to the wireless device for PUCCH resource selection before establishing a dedicated radio resource control configuration based on the resource configuration.

12 Claims, 6 Drawing Sheets

(56) References Cited

U.S. PATENT DOCUMENTS

| | | | | |
|---|---|---|---|---|
| 2014/0328312 | A1* | 11/2014 | Seo | H04L 1/1861 370/329 |
| 2015/0092692 | A1* | 4/2015 | Kim | H04L 5/0016 370/329 |
| 2019/0036653 | A1* | 1/2019 | Lunttila | H04L 1/1861 |
| 2019/0261353 | A1* | 8/2019 | Wang | H04L 5/0055 |
| 2019/0297618 | A1* | 9/2019 | Yang | H04L 5/0044 |
| 2019/0313400 | A1* | 10/2019 | Farag | H04L 5/0055 |
| 2020/0366446 | A1* | 11/2020 | Matsumura | H04L 5/0007 |
| 2020/0403835 | A1* | 12/2020 | Matsumura | H04W 72/042 |

FOREIGN PATENT DOCUMENTS

| | | |
|---|---|---|
| WO | 2011077743 A1 | 6/2011 |
| WO | 2011126329 A2 | 10/2011 |
| WO | 2013183749 A1 | 12/2013 |
| WO | 2014007548 A1 | 1/2014 |

OTHER PUBLICATIONS

International Search Report and Written Opinion dated Jun. 24, 2019 for International Application No. PCT/EP2019/059803 filed on Apr. 16, 2019, consisting of 11-pages.

3GPP TS 38.213 V15.1.0; 3rd Generation Partnership Project; Technical Specification Group Radio Access Network; NR; Physical layer procedures for control (Release 15); Mar. 2018, consisting of 77-pages.

3GPP TSG-RAN WG1 #92bis R1-1805509; Title: Remaining open items on PUCCH resource allocation; Source: Nokia, Nokia Shanghai Bell; Agenda Item: 7.1.3.2.4; Document for: Discussion and Decision; Date and Location: Apr. 16-20, 2018, Sanya, China, consisting of 9-pages.

3GPP TSG-RAN WG1 #92bis R1-1803835; Title: Remaining issues on PUCCH resource allocation; Source: VIVO; Agenda Item: 7.1.3.2.4; Document for: Discussion and Decision; Date and Location: Apr. 16-20, 2018, Sanya, China, consisting of 5-pages.

3GPP TSG RAN WG1 #92bis R1-1805186; Title: On PUCCH Resource Allocation; Source: Ericsson; Agenda Item: 7.1.3.2.4; Document for: Discussion and Decision; Date and Location: Apr. 16-20, 2018, Sanya, China, consisting of 8-pages.

Russian Office Action with Search Report and English Translation dated Mar. 2, 2021 for International Application No. PCT/EP2019/059803 filed Apr. 16, 2019, consisting of 13-pages.

Japanese Decision to Grant and English Machine Translation dated Jan. 18, 2022 for Application No. 2020-555816, consisting of 5 pages.

3GPP TSG RAN WG1 Meeting #92bis R1-1803647; Title: Remaining issues on resource allocation for PUCCH; Agenda Item: 7.1.3.2.4; Source: Huawei, HiSilicon; Document for: Discussion and decision; Location and Date: Sanya, China, Apr. 16-20, 2018, consisting of 6 pages.

3GPP TSG-RAN WG1 #91 R1-1720014; Title: PUCCH Resource Allocation; Agenda item: 7.3.2.4; Source: Nokia, Nokia Shanghai Bell; Document for: Discussion and Decision; Location and Date: Reno, Nevada, USA, Nov. 27-Dec. 1, 2017, consisting of 11 pages.

\* cited by examiner

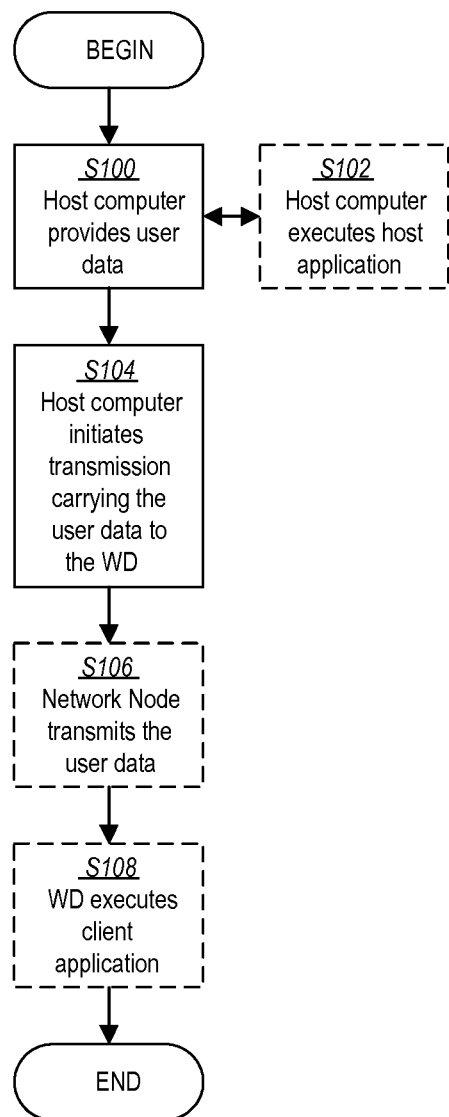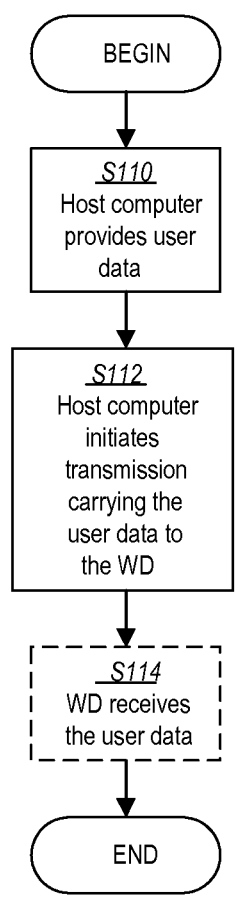
FIG. 3
FIG. 4

PHYSICAL UPLINK CONTROL CHANNEL (PUCCH) RESOURCE SELECTION BEFORE RADIO RESOURCE CONTROL (RRC) CONFIGURATION

CROSS-REFERENCE TO RELATED APPLICATIONS

This application is a Submission Under 35 U.S.C. § 371 for U.S. National Stage Patent Application of International Application No.: PCT/EP2019/059803, filed Apr. 16, 2019 entitled "PHYSICAL UPLINK CONTROL CHANNEL (PUCCH) RESOURCE SELECTION BEFORE RADIO RESOURCE CONTROL (RRC) CONFIGURATION," which claims priority to U. S. Provisional Application No.: 62/658,284, filed Apr. 16, 2018, the entireties of both of which are incorporated herein by reference.

TECHNICAL FIELD

The present disclosure relates to wireless communications, and in particular, to physical uplink control channel resource configuration and/or resource selection.

BACKGROUND

In one or more existing systems, before a wireless device receives a dedicated Radio Resource Control (RRC) configuration, the wireless device may use Physical Uplink Control Channel (PUCCH) resources provided in System Information Block type 1 (SIB1). In one or more examples, dedicated RRC configuration refers to RRC configuration after a random access procedure such as in a situation where a wireless device is in a RRC connected mode. In one or more examples, dedicated RRC configuration with respect to a wireless device relates to the wireless device being in RRC connected mode. SIB1 may provide an index of a table with 16 different PUCCH resource configurations. The table may be hard coded in a Third Generation Partnership Project (3GPP) based standard such as New Radio (NR) specification. Each PUCCH resource configuration may provide and/or correspond to 16 PUCCH resources. After the wireless device receives SIB1, the wireless device may be configured with a PUCCH resource configuration providing 16 PUCCH resources.

The Downlink Control Information (DCI) that schedules Physical Downlink Shared Channel (PDSCH) transmission may be acknowledged by an Acknowledgement (ACK)/Negative Acknowledgement (NACK) containing a PUCCH resource indicator field to identify one of the PUCCH resources. However, the PUCCH resource indicator field may only be three bits, which enables a selection of one out of eight PUCCH resources.

SUMMARY

Some embodiments advantageously provide methods, systems, and apparatuses for Physical Uplink Control Channel (PUCCH) configuration and selection.

For Physical Downlink Control Channel (PDCCH) aggregation level 16, a different implicit rule may be implemented than what is used for other aggregation levels. In one or more embodiments, an implicit rule may be used such that, in this case, the 3 bits provided with the PUCCH resource indicator field are used to select one PUCCH resource out of a cardinality-8 subset of the 16 PUCCH resources. In one or more embodiments, the implicit bit is provided not using the PDCCH candidate or starting CCE of the PDCCH, but may be provided by using, e.g., a bit provided in another DCI field, e.g., a bit provided as part of the Downlink (DL) assignment indicator (DAI).

For PDCCH aggregation levels less than 16 another rule may be implemented or used. For example, the PDCCH candidate number or (start) CCE used for the PDCCH may be used to provide the additional bit.

According to one aspect of the disclosure, a network node is configured to communicate with a wireless device. The network node includes processing circuitry configured to determine a resource configuration for Physical Uplink Control Channel, PUCCH, for a wireless device where the resource configuration corresponding to one PUCCH resource out of a cardinality-8 subset of 16 PUCCH resources, and provide the resource configuration.

According to one or more embodiments of this aspect, the resource configuration for PUCCH is based on a mathematical function that provides different bit values based on a Physical Downlink Control Channel, PDCCH, aggregation level. According to one or more embodiments of this aspect, an input to the mathematical function is a PDCCH candidate number. According to one or more embodiments of this aspect, the resource configuration for PUCCH is for a Physical Downlink Control Channel, PDCCH, aggregation level of 16. According to one or more embodiments of this aspect, the cardinality-8 subset corresponds to even indexed PUCCH resources of the 16 PUCCH resources.

According to one or more embodiments of this aspect, the resource configuration for PUCCH is based at least in part on one bit with a function that has been re-purposed to provide an additional bit in addition to a three bit PUCCH resource indicator field. According to one or more embodiments of this aspect, the resource configuration for PUCCH is for a Physical Downlink Control Channel, PDCCH, aggregation level below 16 where information for PUCCH is based on one of downlink control information, a property of the PDCCH and Physical Downlink Shared Channel. According to one or more embodiments of this aspect, the processing circuitry is further configured to provide the resource configuration for PUCCH to the wireless device for PUCCH resource selection before establishing a dedicated radio resource control configuration. According to one or more embodiments of this aspect, the resource configuration for PUCCH is indicated using three bits of an indicator field.

According to one or more embodiments, a method implemented in a network node is configured to communicate with a wireless device. A resource configuration for Physical Uplink Control Channel, PUCCH, for a wireless device is determined where the resource configuration corresponding to one PUCCH resource out of a cardinality-8 subset of 16 PUCCH resources. The resource configuration is provided.

According to one or more embodiments of this aspect, the resource configuration for PUCCH is based on a mathematical function that provides different bit values based on a Physical Downlink Control Channel, PDCCH, aggregation level. According to one or more embodiments of this aspect, an input to the mathematical function is a PDCCH candidate number. According to one or more embodiments of this aspect, the resource configuration for PUCCH is for a Physical Downlink Control Channel, PDCCH, aggregation level of 16. According to one or more embodiments of this aspect, the cardinality-8 subset corresponds to even indexed PUCCH resources of the 16 PUCCH resources.

According to one or more embodiments of this aspect, the resource configuration for PUCCH is based at least in part on one bit with a function that has been re-purposed to provide an additional bit in addition to a three bit PUCCH resource indicator field. According to one or more embodiments of this aspect, the resource configuration for PUCCH is for a Physical Downlink Control Channel, PDCCH, aggregation level below 16 where information for PUCCH is based on one of downlink control information, a property of the PDCCH and Physical Downlink Shared Channel.

According to one or more embodiments of this aspect, the resource configuration for PUCCH is provided to the wireless device for PUCCH resource selection before establishing a dedicated radio resource control configuration. According to one or more embodiments of this aspect, the resource configuration for PUCCH is indicated using three bits of an indicator field.

According to another aspect of the disclosure, a wireless device is configured to communicate with a network node. The wireless device includes processing circuitry (84) configured to receive a resource configuration for a Physical Uplink Control Channel, PUCCH, and select a PUCCH resource based at least in part on the resource configuration where the PUCCH resource is one out of a cardinality-8 subset of 16 PUCCH resources.

According to one or more embodiments of this aspect, the selection of the PUCCH resource is based on a mathematical function that provides different bit values based on the Physical Downlink Control Channel, PDCCH, aggregation level. According to one or more embodiments of this aspect, an input to the mathematical function is a PDCCH candidate number. According to one or more embodiments of this aspect, the cardinality-8 subset corresponds to even indexed PUCCH resources of the 16 PUCCH resources.

According to one or more embodiments of this aspect, the PUCCH resource selection is based at least in part on one bit with a function that has been re-purposed to provide an additional bit in additional to a three bit PUCCH resource indicator field. According to one or more embodiments of this aspect, if the PDCCH aggregation level is below 16, the PUCCH resource selection being based on one of downlink control information, a property of the PDCCH and Physical Downlink Shared Channel. According to one or more embodiments of this aspect, the PUCCH resource selection is based at least in part on one implicitly signaled bit for the PDCCH aggregation level of 16 or one explicitly signaled bit for the PDCCH aggregation level below 16.

According to another aspect of the disclosure, a method implemented in a wireless device configured to communicate with a network node is provided. A resource configuration for a Physical Uplink Control Channel, PUCCH is received. A PUCCH resource is selected based at least in part on the resource configuration, the PUCCH resource being one out of a cardinality-8 subset of 16 PUCCH resources. According to one or more embodiments of this aspect, the selection of the PUCCH resource is based on a mathematical function that provides different bit values based on the PDCCH aggregation level. According to one or more embodiments of this aspect, an input to the mathematical function is a Physical Downlink Control Channel, PDCCH, candidate number. According to one or more embodiments of this aspect, the cardinality-8 subset corresponds to even indexed PUCCH resources of the 16 PUCCH resources. According to one or more embodiments of this aspect, the PUCCH resource selection is based at least in part on one bit with a function that has been re-purposed to provide an additional bit in additional to a three bit PUCCH resource indicator field.

According to one or more embodiments of this aspect, if the PDCCH aggregation level is below 16, the PUCCH resource selection being based on one of downlink control information, a property of the PDCCH and Physical Downlink Shared Channel. According to one or more embodiments of this aspect, the PUCCH resource selection is based at least in part on: one implicitly signaled bit for the PDCCH aggregation level of 16 or one explicitly signaled bit for the PDCCH aggregation level below 16.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

DETAILED DESCRIPTION

Figure 1:
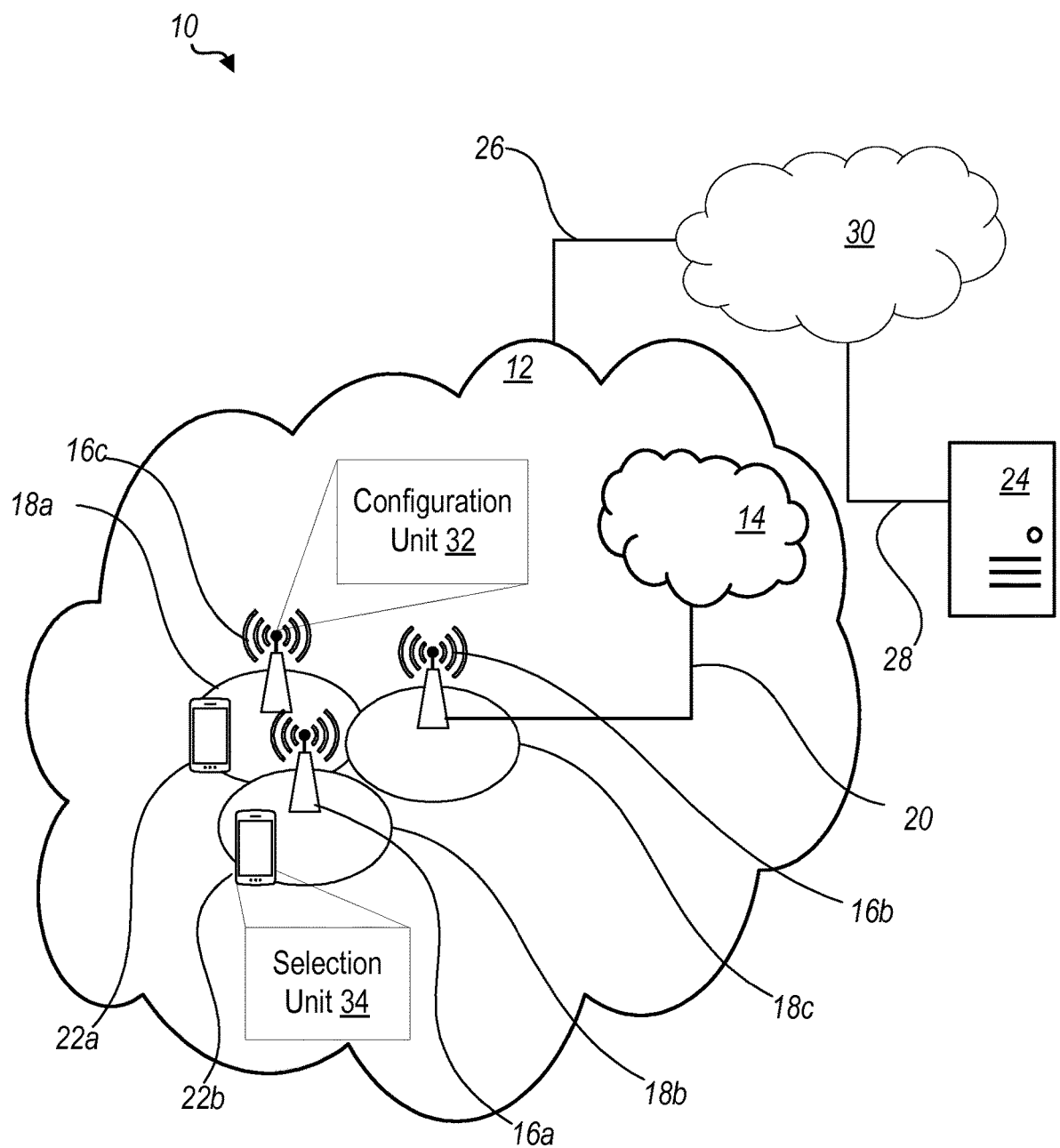
FIG. 1 is a schematic diagram of an exemplary network architecture illustrating a communication system connected via an intermediate network to a host computer according to the principles in the present disclosure.

As discussed above, the PUCCH resource indicator field may only be three bits, which enables a selection by a wireless device of one out of eight PUCCH resources. In some systems, the additional 1 bit is implicitly provided, e.g., by the (start of the) Control Channel Element (CCE) of the Physical Downlink Control Channel (PDCCH) or the PDCCH candidate number used to transmit the DCI scheduling the PDSCH. However, for PDCCH aggregation level of 16, only one PDCCH candidate may exist such that, in this case, the PDCCH candidate may not be used to determine an extra information bit. The disclosure solves at least part of the problem(s) with existing systems at least in part by defining wireless device behavior on how to select a PUCCH resource such as prior to or before dedicated RRC configuration (e.g., before establishing of a dedicated RRC configuration with the network node or before establishment of a dedicated RRC configuration between the wireless device and the network node) for various PDCCH aggregation levels, such as PDCCH aggregation level of 16. In one or more examples, dedicated RRC configuration corresponds to a wireless device being in RRC connected mode. In one or more examples, depending on the aggregation level of the PDCCH, different implicit resource selection behaviors/methods are implemented for selection a PUCCH resource. In one or more embodiments, the wireless device may be assumed to have been previously configured with 16 PUCCH resources such that the wireless device may select one of the 16 PUCCH resources as described herein.

Before describing in detail exemplary embodiments, it is noted that the embodiments reside primarily in combinations of apparatus components and processing steps related to selection of a PUCCH resource. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DMRS according to 3GPP and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for selection of a PUCCH resource as various aggregation levels. Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to determine and provide a resource configuration to WD 22, as described herein. A wireless device 22 is configured to include a selection unit 34 which is configured to receive a resource configuration and select a PUCCH resource before dedicated radio resource control (RRC) configuration, as described herein.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to determine and/or provide resource configuration information to WD 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 50 stored internally in, for example, memory 72, or stored in external memory (e.g., database, storage array, network storage device, etc.) accessible by the network node 16 via an external connection. The software 50 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 50 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to determine a resource configuration for PUCCH, e.g, PUCCH resource allocation, for a wireless device, as described herein, and provide the configuration to the wireless device for PUCCH resource selection before dedicated radio resource control (RRC) configuration (e.g., before establishing of a dedicated RRC configuration with the wireless device 22 or before establishment of a dedicated RRC configuration between the wireless device 22 and the network node 16) based on the resource configuration, as described herein.

In one or more embodiments, the resource configuration is for an aggregation level of 16 where: the resource configuration corresponds to a cardinality-8 subset mapping to 16 PUCCH resources, or the resource configuration corresponds to one bit with a function that has been re-purposed to provide an additional bit in addition to a three bit PUCCH resource indicator field, as described herein. In one or more embodiments, the resource configuration is for the aggregation level below 16 where information for PUCCH resource selection is based on downlink control information or a property of the Physical Downlink Control Channel or Physical Downlink Shared Channel. In one or more embodiments, the resource configuration corresponds to: one implicitly signaled implicit bit for the aggregation level of 16, or one explicitly signaled bit for the aggregation level below 16.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a selection unit 34 configured to receive a resource configuration for PUCCH, as described herein, and select a PUCCH resource before dedicated RRC configuration (e.g., before establishing of a dedicated RRC configuration with the network node 16 or before establishment of a dedicated RRC configuration between the wireless device 22 and the network node 16) based on the received resource configuration, as described herein.

In one or more embodiments, the resource configuration is for the aggregation level of 16 where: the resource configuration corresponds to a cardinality-8 subset mapping to 16 PUCCH resources, or the resource configuration corresponds to one bit with a function that has been re-purposed to provide an additional bit in addition to a three bit PUCCH resource indicator field, as described herein. In one or more embodiments, the resource configuration is for the aggregation level below 16 where information for PUCCH resource selection is based on downlink control information or a property of the Physical Downlink Control Channel or Physical Downlink Shared Channel. In one or more embodiments, the resource configuration corresponds to: one implicitly signaled implicit bit for the aggregation level of 16, or one explicitly signaled bit for the aggregation level below 16.

Figure 2:
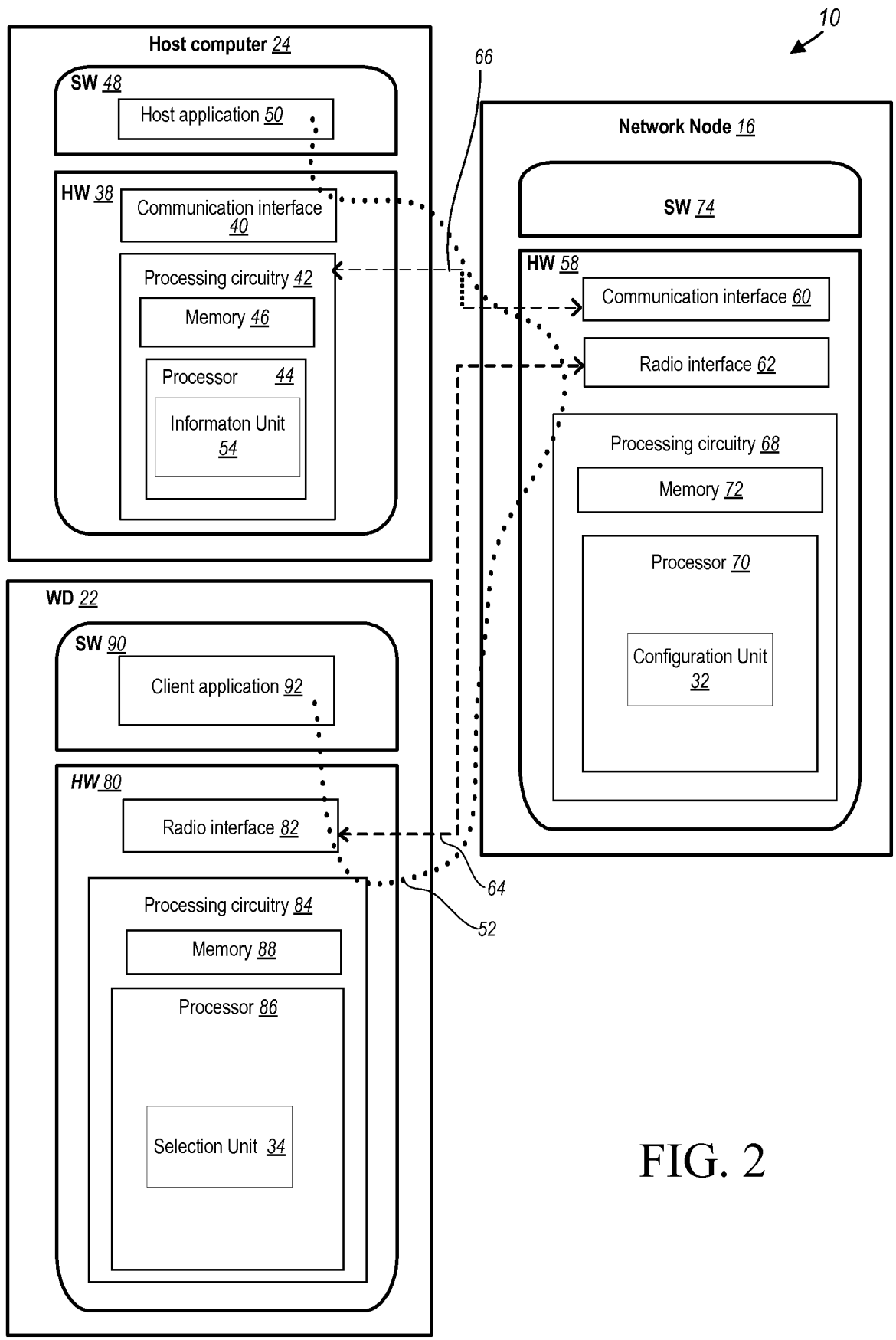
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as configuration unit 32, and selection unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 92, associated with the host application 74 executed by the host computer 24 (block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figures 5, 6:
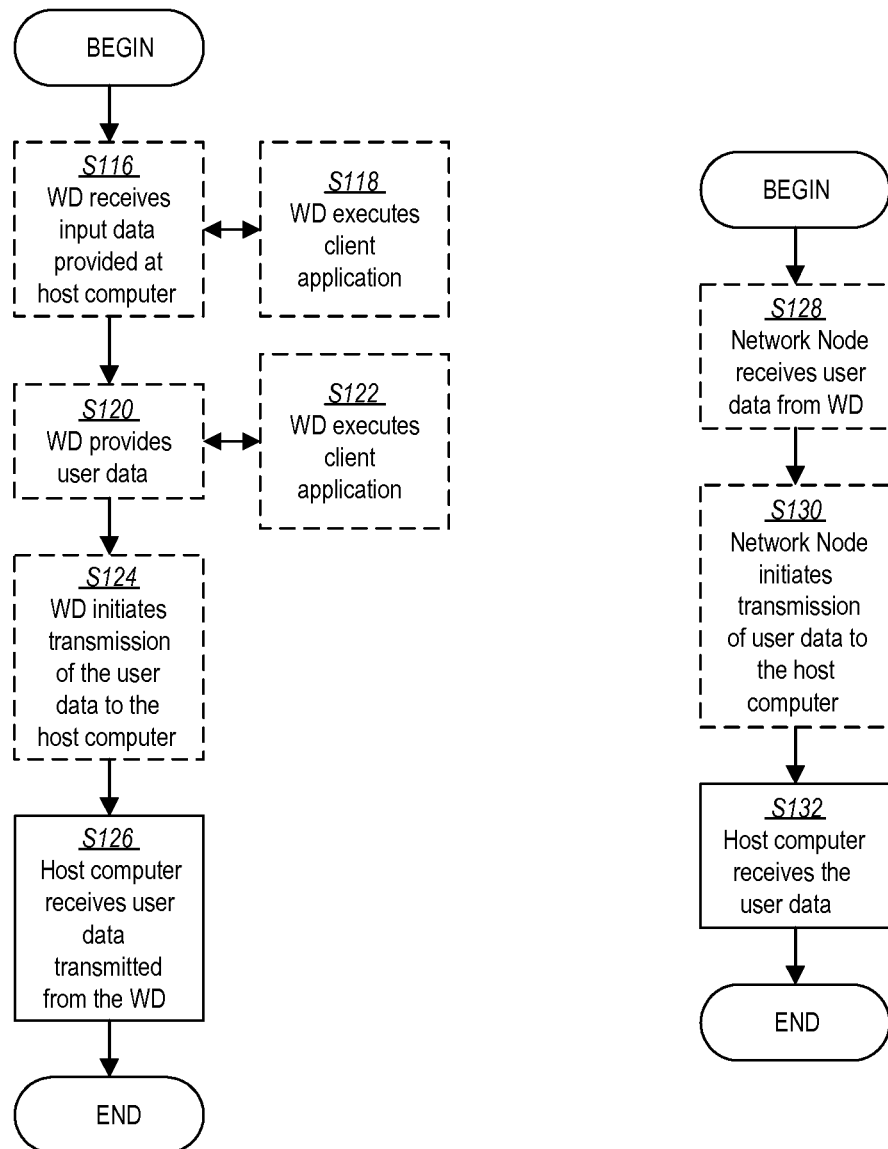
FIG. 5 is a flowchart illustrating exemplary methods implemented in a communication system including a host computer, a network node and a wireless device for receiving user data from the wireless device at a host computer according to some embodiments of the present disclosure.
FIG. 6 is a flowchart illustrating exemplary methods implemented in a communication system including a host computer, a network node and a wireless device for receiving user data at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (block S116). In an optional substep of the first step, the WD 22 executes the client application 92, which provides the user data in reaction to the received input data provided by the host computer 24 (block S118). Additionally or alternatively, in an optional second step, the WD 22 provides user data (block S120). In an optional substep of the second step, the WD 22 provides the user data by executing a client application, such as, for example, client application 92 (block S122). In providing the user data, the executed client application 92 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 7:
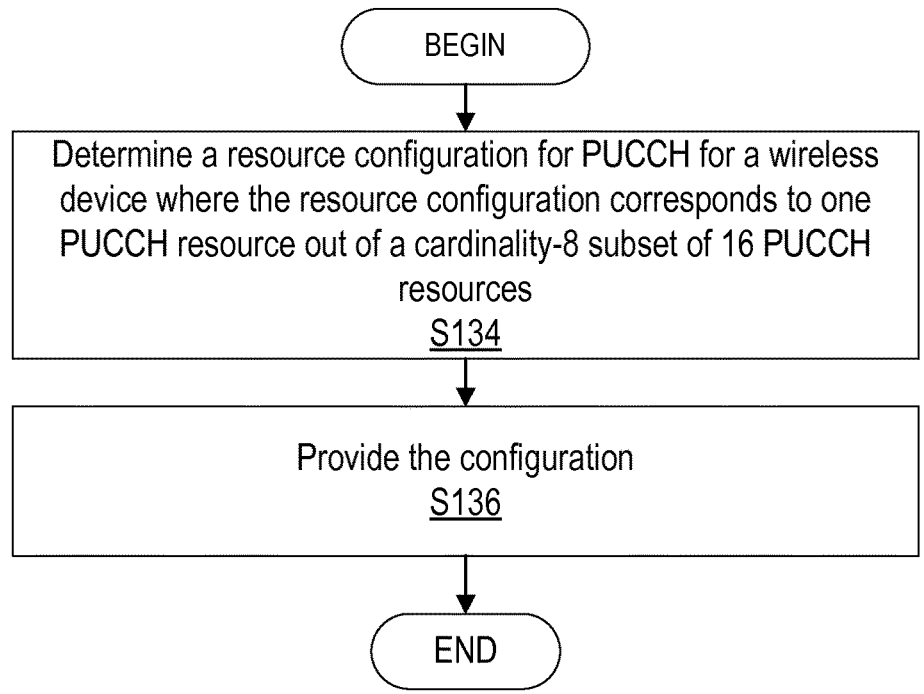
FIG. 7 is a flowchart of an exemplary process in a network node for resource configuration according to some embodiments of the present disclosure.

FIG. 7 is a flowchart of an exemplary process in a network node 16 for resource configuration. One or more blocks and/or functions performed by network node 16 may be performed by one or more elements of network node 16 such as by configuration unit 32 in processing circuitry 68, processor 70, radio interface 62, etc. In one or more embodiments, network node 16 such as via one or more of processing circuitry 68 and configuration unit 32, processor 70 is configured to determine (block S134) a resource configuration for PUCCH, e.g., for PUCCH resource allocation, for a wireless device, as described herein. As used herein, the resource configuration may indicate the PUCCH resource that the wireless device 22 is to use and/or select, as described herein, thereby providing a configuration of a resource. In one or more embodiments, network node 16 such as via one or more of processing circuitry 68, configuration unit 32, processor 70, communication interface 60 and radio interface 62 is configured to provide (block S136) the resource configuration to the wireless device 22. In one or more embodiments, the resource configuration is provided for PUCCH resource selection before establishing a dedicated radio resource control configuration based on the resource configuration, as described herein. In one or more examples, the PUCCH resource selection occurs before establishing of a dedicated RRC configuration with the wireless device 22 or before establishment of a dedicated RRC configuration between the wireless device 22 and the network node 16.

In one or more embodiments, the resource configuration for PUCCH is based on a mathematical function that provides different bit values based on a Physical Downlink Control Channel, PDCCH, aggregation level. In one or more embodiments, an input to the mathematical function is a PDCCH candidate number. In one or more embodiments, the resource configuration for PUCCH is for a Physical Downlink Control Channel, PDCCH, aggregation level of 16. In one or more embodiments, the resource configuration is for the aggregation level of 16 where: the resource configuration corresponds to a cardinality-8 subset mapping to 16 PUCCH resources, or the resource configuration corresponds to one bit with a function that has been re-purposed to provide an additional bit in addition to a three bit PUCCH resource indicator field, as described herein. In one or more embodiments, the resource configuration for PUCCH is based at least in part on one bit with a function that has been re-purposed to provide an additional bit in addition to a three bit PUCCH resource indicator field. In one or more embodiments, the resource configuration is for the aggregation level below 16 where information for PUCCH resource selection is based on one of downlink control information, a property of the Physical Downlink Control Channel and Physical Downlink Shared Channel. In one or more embodiments, the resource configuration corresponds to: one implicitly signaled implicit bit for the aggregation level of 16, or one explicitly signaled bit for the aggregation level below 16. In one or more embodiments, the processing circuitry 68 is further configured to provide the resource configuration for PUCCH to the wireless device 22 for PUCCH resource selection before establishing a dedicated radio resource control configuration. In one or more embodiments, the resource configuration for PUCCH is indicated using three bits of an indicator field.

Figure 8:
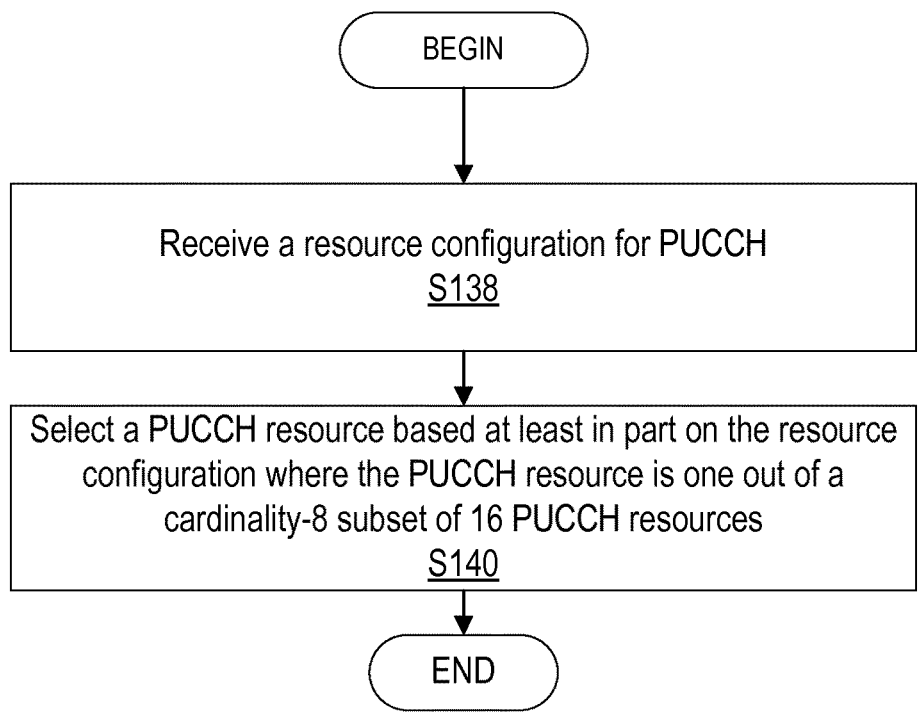
FIG. 8 is a flowchart of an exemplary process in a wireless device for resource selection according to some embodiments of the present disclosure.

FIG. 8 is a flowchart of an exemplary process in a wireless device 22 for resource selection according to some embodiments of the present disclosure. One or more blocks and/or functions performed by wireless device 22 may be performed by one or more elements of wireless device 22 such as by selection unit 34 in processing circuitry 84, processor 86, radio interface 82, etc. In one or more embodiments, wireless device 22 such as via one or more of processing circuitry 84, selection unit 34, processor 86 and radio interface 82 is configured to receive (block S138) a resource configuration for PUCCH, as described herein (block S138). In one or more embodiments, wireless device 22 such as via one or more of processing circuitry 84, selection unit 34, processor 86 and radio interface 82 is configured to select (block S140) a PUCCH resource. In one or more embodiments, the PUCCH resource is selected before establishment of a dedicated radio resource control based on the received resource configuration, as described herein. In one or more embodiments, the selecting of the PUCCH resource occurs before establishing of a dedicated RRC configuration with the network node 16 or before establishment of a dedicated RRC configuration between the wireless device 22 and the network node 16. In one or more embodiments, the PUCCH resource is selected based at least in part on the resource configuration where the PUCCH resource is one out of a cardinality-8 subset of 16 PUCCH resources.

In one or more embodiments, the selection of the PUCCH resource is based on a mathematical function that provides different bit values based on the Physical Downlink Control Channel, PDCCH, aggregation level. In one or more embodiments, an input to the mathematical function is a PDCCH candidate number. In one or more embodiments, the cardinality-8 subset corresponds to even indexed PUCCH resources of the 16 PUCCH resources. In one or more embodiments, the PUCCH resource selection is based at least in part on one bit with a function that has been re-purposed to provide an additional bit in additional to a three bit PUCCH resource indicator field. In one or more embodiments, if the PDCCH aggregation level is below 16 where the PUCCH resource selection is based on one of downlink control information, a property of the PDCCH and Physical Downlink Shared Channel.

In one or more embodiments, the resource configuration is for the aggregation level of 16 where: the resource configuration corresponds to a cardinality-8 subset mapping to 16 PUCCH resources, or the resource configuration corresponds to one bit with a function that has been re-purposed to provide an additional bit in addition to a three bit PUCCH resource indicator field, as described herein. In one or more embodiments, the cardinality-8 subset corresponds to even indexed PUCCH resources of the 16 PUCCH resources. In one or more embodiments, the resource configuration is for the aggregation level below 16 where information for PUCCH resource selection is based on downlink control information or a property of the Physical Downlink Control Channel or Physical Downlink Shared Channel. In one or more embodiments, the resource configuration corresponds to: one implicitly signaled implicit bit for the aggregation level of 16, or one explicitly signaled bit for the aggregation level below 16. In one or more embodiments, the PUCCH resource selection is based at least in part on one implicitly signaled bit for the PDCCH aggregation level of 16 or one explicitly signaled bit for the PDCCH aggregation level below 16.

Having generally described arrangements for selection and/or determination of a PUCCH resource prior to RRC configuration, details for these arrangements, functions and processes are provided as follows.

Embodiment 1

Figure 9:
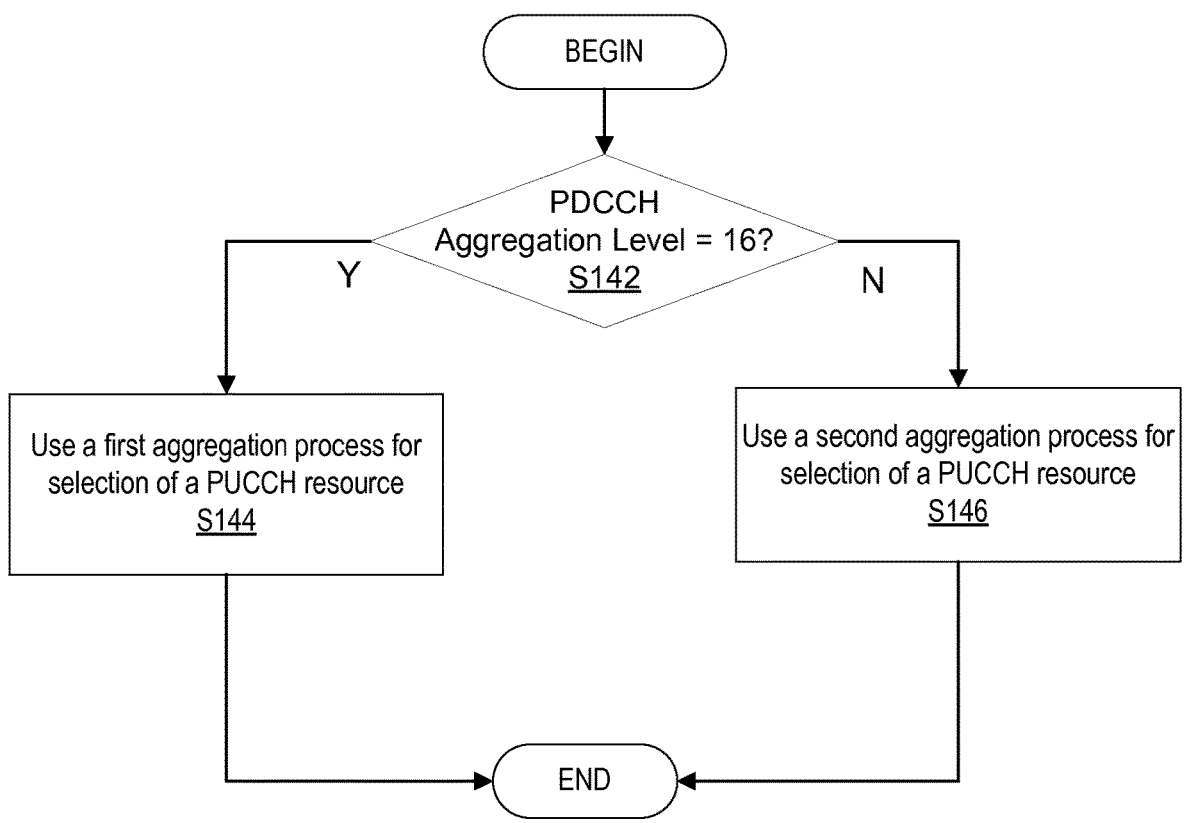
FIG. 9 is a flowchart of an exemplary process in a wireless device for resource selection according to some embodiments of the present disclosure.

In one or more examples, a different rule is used to determine a PUCCH resource prior dedicated RRC configuration (e.g., before establishing of a dedicated RRC configuration with the network node 16 or before establishment of a dedicated RRC configuration between the wireless device 22 and the network node 16) for PDCCH aggregation level of 16 compared to other aggregation levels as illustrated in FIG. 9 that is a flow diagram of a selection process in accordance with the principles of the disclosure. In particular, In one or more embodiments, wireless device 22 such as via one or more of processing circuitry 84, selection unit 34 and processor 86 may be configured to determine (block S142) a PDCCH aggregation level, as described herein. In one or more embodiments, wireless device 22 such as via one or more of processing circuitry 84, selection unit 34, processor 86 and radio interface 82, if the PDCCH aggregation level is equal to (=) 16, uses (block S144) a first aggregation process for selection of a PUCCH resource. In one or more embodiments, the first aggregation process corresponds to Method 1 described below. In one or more embodiments, wireless device 22 such as via one or more of processing circuitry 84, selection unit 34, processor 86 and radio interface 82, if the PDCCH aggregation level is not equal to 16, uses (block S146) a second aggregation process for selection of a PUCCH resource. In one or more embodiments, the first aggregation process corresponds to Method 2 described below.

Some Examples of Method/where the PDCCH Aggregation Level is 16

In one example, WD 22 may avoid the use or not use any implicit resource allocation. In this case, 3 bits provided in the PUCCH resource indicator field by network node 16 are used by the wireless device 22 such a via processing circuitry 84 and/or selection unit 34 to select one out of 8 PUCCH resources. Since WD 22 has 16 PUCCH resource configured, a cardinality-8 subset may be formed out of the 16 resources. Since WD 22 may not use any additional information such as implicit resource allocation information, this cardinality-8 subset may be defined in the 3GPP standard such as the NR standard, thereby allowing the 3 bits to be used to select a PUCCH resource out of a cardinality-8 subset of the 16 PUCCH resources. For example, the cardinality-8 subset may be a first 8 resources, the even indexed resources, or other 8 resources of the 16 resources. Alternatively, the table that specifies 16 PUCCH resource configurations with 16 PUCCH resources each, may provide for each PUCCH resource configuration a 16-element set and an 8-element set.

In another example, the additional 1-bit information may not be based on the PDDCH candidate number or (start) CCE of the PDCCH but may be based on another or additional bit such as a bit provided in another DCI field that is not used for PUCCH resource selection in existing system. Examples of the additional 1-bit information could be a bit re-purposed from a DAI field, a HARQ process ID field, a power control command bit, etc., such that this bit may be used together with the 3 bits provided in the PUCCH resource indicator field to form 4 bits that can be used to indicate a PUCCH resource from among 16 PUCCH resources that the wireless device 22 may be configured with. In one or more examples, a re-purposed bit may correspond to a bit that has be configured to function as the additional bit described herein, where the re-purposed bit may still perform its original predefined functions and/or may only provide the additional bit functions such as while still in the same format/field. These 4 bits may select one of the 16 PUCCH resources for configuration of the WD 22. In general, any DCI content or property of the PDCCH (carrying the DCI) used to schedule the PDSCH, which is acknowledged, may be used to obtain the additional 1-bit information. Also, a property of the PDSCH can be used to provide the additional bit. In one or more examples, the DCI field or PDCCH/PDSCH property is different or is used differently than in Method 2 described below. Examples of properties of PDCCH/PDSCH may include time-frequency resource allocation, scrambling codes, RNTI values, etc.

Some Examples of Method 2 where the PDCCH Aggregation Level is 16

In Method 2, the implicit information provided by the additional bit may, for example, be derived by the wireless device 22 from the PDCCH candidate number or the (start) CCE used for the PDCCH, such as in NR where some aggregation levels lower than 16 provide more than two PDCCH candidates. For example, a 3GPP standard such as NR may provide two PDCCH candidates for the aggregation level of 8, and 4 PDCCH candidates for aggregation level 4. Since only 1 additional information bit may be needed, in case of the aggregation level 8, the PDCCH candidate may be directly used to indicate the additional 1 bit information. For the aggregation level of 4, two PDCCH candidates may have to provide the same additional bit value, e.g., {PDDCH candidate 0, PDCCH candidates 1}→0 and {PDDCH candidate 2, PDCCH candidates 3}→1. This may be expressed as a mathematical function as a bit value bv=⌊m·AL/8⌋ with m being the PDCCH candidate number and AL being the aggregation level. This expression is applicable to both aggregation level of 4 and 8. Another example may be {PDDCH candidate 0, PDCCH candidates 2}→0 and {PDDCH candidate 1, PDCCH candidates 3}→1. This may be expressed as bit value bv=mod(m, 2). This expression is applicable to both aggregation level of 4 and 8.

Above expressions/formulas are expressed using the PDCCH candidate. Similar expressions/formulas can be derived for the (start) CCE used to transmit the PDCCH. Also, other expressions/formulas can be derived based on the teachings of this disclosure where the expressions/formulas produce 2 bit values for AL=4 and AL=8.

For Method 2, also other information contained in the DCI or properties of the PDCCH/PDSCH can be used by the wireless device 22, for example, to determine the additional bit. The DCI field or PDCCH/PDSCH property may be different or is used differently than in Method 1. Examples of properties of PDCCH/PDSCH are time-frequency resource allocation, scrambling codes, RNTI values, etc.

Embodiment 2

An expression/formula that depends on the PDCCH candidate and parametrized with the aggregation level may be used to determine an information bit (e.g., determined non-implicit bit or explicit bit) for the aggregation level of 16 (i.e., the formula may always return a fixed value (e.g. 0 or 1) for the aggregation level of 16) while for lower aggregation levels depending on the PDCCH candidate, the formula returns one out of two possible values, e.g., one out of 0 and 1.

Both above formulas, i.e., mathematical functions, may always deliver bv=0 for m=0, irrespective of the aggregation level, i.e., both $$bv = \left\lfloor \frac{m \cdot AL}{8} \right\rfloor$$

or bv=mod(m, 2) can be used to determine the extra bit. In case of the aggregation level of 16, the extra bit may always be bv=0 (since only one PDCCH candidate m=0 exist), i.e., no implicit resource selection is performed while for lower aggregation levels one implicit information bit is provided.

More generally, a function may be provided that takes as input the PDCCH candidate m and is parametrized with AL. Depending on parameter AL, the cardinality of the function's target set varies. For example, for AL=16 the function's target set is constrained to a single output value (e.g., 0) while for AL<16 the target set consists of multiple values, e.g., 0 and 1.

The above formulas are expressed using the PDCCH candidate. Similar formulas can be derived based on the teachings of the disclosure for the (start) CCE used to transmit the PDCCH. In one or more embodiments, the formulas described herein may be implemented by wireless device 22 such as via processing circuitry 84 and/or selection unit 34.

Generalization

At least a portion of the above disclosure may have assumed that the WD 22 has in total 16 PUCCH resources and any one of 8 PUCCH resources may be selected with the PUCCH resource indicator field and that the additional information bit is provided implicitly to allow for selection of any one of the 16 PUCCH resources. The methods can be generalized, e.g., no implicit selection is performed for the aggregation level of 16 but 2 implicit bits are provided for lower aggregation levels or 1 implicit bit is provided for the aggregation level of 16 and 2 implicit bits are provided for the aggregation level less than 16. Also, it can be generalized that WD 22 may be configured with 16 PUCCH resources that could be different, e.g., a WD 22 could be configured with 32 PUCCH resources. The disclosure is also applicable to other aggregation levels other than 16.

EXAMPLES

Example A1. A network node 16 configured to communicate with a wireless device 22 (WD 22), the network node 16 configured to, and/or comprising a radio interface 62 and/or comprising processing circuitry 68 configured to:

determine a resource configuration for Physical Uplink Control Channel, PUCCH, resource allocation for a wireless device 22; and provide the configuration to the wireless device 22 for PUCCH resource selection before establishing a dedicated radio resource control configuration based on the resource configuration.

Example A2. The network node 16 of Example A1, wherein the resource configuration is for an aggregation level of 16 where:

the resource configuration corresponds to a cardinality-8 subset mapping to 16 PUCCH resources; or the resource configuration corresponds to one bit with a function that has been re-purposed to provide an additional bit in additional to a three bit PUCCH resource indicator field.

Example A3. The network node 16 of Example A1, wherein the resource configuration is for a Physical Downlink Control Channel, PDCCH, aggregation level below 16 where information for PUCCH resource selection is based on downlink control information or a property of the PDCCH or Physical Downlink Shared Channel.

Example A4. The network node 16 of Example A1, wherein the resource configuration corresponds to:

one implicitly signaled implicit bit for a Physical Downlink Control Channel, PDCCH, aggregation level of 16; or one explicitly signaled bit for the PDCCH aggregation level below 16.

Example B1. A method implemented in a network node 16, the method comprising:

determining a resource configuration for Physical Uplink Control Channel, PUCCH, resource allocation for a wireless device 22; and providing the configuration to the wireless device 22 for PUCCH resource selection before establishing a dedicated radio resource control configuration based on the resource configuration.

Example B2. The method of Example B1, wherein the resource configuration is for a Physical Downlink Control Channel, PDCCH, aggregation level of 16 where:

the resource configuration corresponds to a cardinality-8 subset mapping to 16 PUCCH resources; or the resource configuration corresponds to one bit with a function that has been re-purposed to provide an additional bit in addition to a three bit PUCCH resource indicator field.

Example B3. The method of Example B1, wherein the resource configuration is for a Physical Downlink Control Channel, PDCCH, aggregation level below 16 where information for PUCCH resource selection is based on downlink control information or a property of the PDCCH or Physical Downlink Shared Channel, PDSCH.

Example B4. The method of Example B1, wherein the resource configuration corresponds to:

one implicitly signaled implicit bit for a Physical Downlink Control Channel, PDCCH, aggregation level of 16; or one explicitly signaled bit for the PDCCH aggregation level below 16.

Example C1. A wireless device (WD) configured to communicate with a network node 16, the WD 22 configured to, and/or comprising a radio interface 82 and/or processing circuitry 84 configured to:

receive a resource configuration for a Physical Uplink Control Channel, PUCCH; and select a PUCCH resource before establishment of a dedicated radio resource control based on the received resource configuration.

Example C2. The WD 22 of Example C1, wherein the resource configuration is for an aggregation level of 16 where:

the resource configuration corresponds to a cardinality-8 subset mapping to 16 PUCCH resources; or the resource configuration corresponds to one bit with a function that has been re-purposed to provide an additional bit in additional to a three bit PUCCH resource indicator field.

Example C3. The WD 22 of Example C1, wherein the resource configuration is for a Physical Downlink Control Channel, PDCCH, aggregation level below 16 where information for PUCCH resource selection is based on downlink control information or a property of the PDCCH or Physical Downlink Shared Channel.

Example C4. The WD 22 of Example C1, wherein the resource configuration corresponds to:

one implicitly signaled implicit bit for a Physical Downlink Control Channel, PDCCH, aggregation level of 16; or one explicitly signaled bit for the PDCCH aggregation level below 16.

Example D1. A method implemented in a wireless device 22 (WD 22), the method comprising:

receiving a resource configuration for Physical Uplink Control Channel, PUCCH; and selecting a PUCCH resource before establishment of a dedicated radio resource control based on the received resource configuration.

Example D2. The method of Example D1, wherein the resource configuration is for an aggregation level of 16 where:

the resource configuration corresponds to a cardinality-8 subset mapping to 16 PUCCH resources; or the resource configuration corresponds to one bit with a function that has been re-purposed to provide an additional bit in addition to a three bit PUCCH resource indicator field.

Example D3. The method of Example D1, wherein the resource configuration is for a Physical Downlink Control Channel, PDCCH, aggregation level below 16 where information for PUCCH resource selection is based on downlink control information or a property of the PDCCH or Physical Downlink Shared Channel.

Example D4. The method of Example D1, wherein the resource configuration corresponds to:

one implicitly signaled implicit bit for a Physical Downlink Control Channel, PDCCH, aggregation level of 16; or one explicitly signaled bit for the PDCCH aggregation level below 16.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Abbreviations that may be used in the preceding description include:

| Abbreviation | Explanation |
| --- | --- |
| ACK/NACK | Acknowledgment/Not-acknowledgment |
| CCE | Control Channel Element |
| DAI | Downlink Assignment Indicator |
| DCI | Downlink Control Information |
| PDCCH | Physical Downlink Control Channel |
| PDSCH | Physical Downlink Shared Data Channel |
| PUCCH | Physical Uplink Control Channel |
| RRC | Radio Resource Control |

| Abbreviation | Explanation |
| --- | --- |
| RNTI | Radio Network Temporary Identifier |
| SIB1 | System Information Block 1 |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A network node configured to communicate with a wireless device, the network node comprising processing circuitry configured to:
   determine a resource for Physical Uplink Control Channel, PUCCH, for a wireless device using a resource configuration for PUCCH, the resource configuration providing 16 PUCCH resources, the resource corresponding to one PUCCH resource out of a cardinality-8 subset of the 16 PUCCH resources, the resource being for a Physical Downlink Control Channel, PDCCH, aggregation level of 16, and the cardinality-8 subset corresponding to even indexed PUCCH resources of the 16 PUCCH resources, the resource being determined by three bits in a PUCCH resource indicator field; and
   provide the PUCCH resource indicator field to the wireless device; and
   when the PDCCH aggregation level is below 16, a resource for PUCCH is determined using the resource configuration based on a property of the PDCCH and the three bits of the PUCCH resource indicator field.

2. The network node of claim 1, wherein the processing circuitry is further configured to provide the resource configuration for PUCCH to the wireless device for PUCCH resource selection before establishing a dedicated radio resource control configuration.

3. The network node of claim 1, wherein the PUCCH resource for PUCCH is indicated using the three bits of the PUCCH resource indicator field and an implicit rule to use only the even indexed PUCCH resources of the 16 PUCCH resources when the PDCCH aggregation level is 16.

4. A method implemented in a network node configured to communicate with a wireless device, the method comprising:
   determining a resource for Physical Uplink Control Channel, PUCCH, for a wireless device using a resource configuration for PUCCH, the resource configuration providing 16 PUCCH resources, the resource corresponding to one PUCCH resource out of a cardinality-8 subset of the 16 PUCCH resources, the resource being for a Physical Downlink Control Channel, PDCCH, aggregation level of 16, and the cardinality-8 subset corresponding to even indexed PUCCH resources of the 16 PUCCH resources, the PUCCH resource being determined by three bits in a PUCCH resource indicator field; and
   providing the PUCCH resource indicator field to the wireless device; and
   when the PDCCH aggregation level is below 16, a PUCCH resource is determined based on one of a property of the PDCCH and the three bits of the PUCCH resource indicator field.

5. The method of claim 4, further comprising providing the resource configuration for PUCCH to the wireless device for PUCCH resource selection before establishing a dedicated radio resource control configuration.

6. The method of claim 4, wherein the PUCCH resource for PUCCH is indicated using the three bits of the PUCCH resource indicator field and an implicit rule to use only the even indexed PUCCH resources of the 16 PUCCH resources when the PDCCH aggregation level is 16.

7. A wireless device configured to communicate with a network node, the wireless device comprising processing circuitry configured to:
   receive a resource configuration for a Physical Uplink Control Channel, PUCCH, the resource configuration providing 16 PUCCH resources; and
   select a PUCCH resource based at least in part on the resource configuration out of a cardinality-8 subset of the 16 PUCCH resources, the resource configuration for PUCCH being for a Physical Downlink Control Channel, PDCCH, aggregation level of 16, the cardinality-8 subset corresponding to even indexed PUCCH resources of the 16 PUCCH resources, the three bits provided in a PUCCH resource indicator field being used to select the PUCCH resource; and
   when the PDCCH aggregation level is below 16, a PUCCH resource selection is based on a property of the PDCCH and the three bits provided in the PUCCH resource indicator field.

8. A method implemented in a wireless device configured to communicate with a network node, the method comprising:
   receiving a resource configuration for a Physical Uplink Control Channel, PUCCH, the resource configuration providing 16 PUCCH resources; and
   selecting a PUCCH resource based at least in part on the resource configuration out of a cardinality-8 subset of the 16 PUCCH resources, the resource configuration for PUCCH being for a Physical Downlink Control Channel, PDCCH, aggregation level of 16, the cardinality-8 subset corresponding to even indexed PUCCH resources of the 16 PUCCH resources, three bits provided in a PUCCH resource indicator field being used to select the PUCCH resource; and
   when the PDCCH aggregation level is below 16, a PUCCH resource selection is based on a property of the PDCCH and the three bits provided in the PUCCH resource indicator field.

9. The wireless device of claim 7, wherein the processing circuitry is further configured to use the three bits provided in the PUCCH resource indicator field to determine the PUCCH resource and an implicit rule to use only the even indexed PUCCH resources of the 16 PUCCH resources when the PDCCH aggregation level is 16.

10. The wireless device of claim 7, wherein the processing circuity is further configured to receive the resource configuration for the PUCCH before establishing a dedicated radio resource control configuration.

11. The method of claim 8, wherein the method further comprises using the three bits provided in the PUCCH resource indicator field to determine the PUCCH resource and an implicit rule to use only the even indexed PUCCH resources of the 16 PUCCH resources when the PDCCH aggregation level is 16.

12. The method of claim 8, wherein the method further comprises receiving the resource configuration for the PUCCH before establishing a dedicated radio resource control configuration.

\* \* \* \* \*